Jan. 13, 1942. H. J. CRAWFORD Re. 22,004

FRUIT AND VEGETABLE SHREDDER

Original Filed Sept. 18, 1939

INVENTOR
Hugh J. Jamieson Crawford
BY
Harry C. Schroeder
ATTORNEY

Reissued Jan. 13, 1942

Re. 22,004

UNITED STATES PATENT OFFICE 22,004

FRUIT AND VEGETABLE SHREDDER

Hugh James Crawford, Oakland, Calif.

Original No. 2,214,075, dated September 10, 1940, Serial No. 295,359, September 18, 1939. Application for reissue December 26, 1940, Serial No. 371,817

5 Claims. (Cl. 146—123)

This invention relates to mechanisms for comminuting materials and particularly to such a device for reducing vegetable matter to the state of pulp.

It is an object of the invention to provide a device of the character described which will quickly and thoroughly reduce materials of a stringy or fibrous nature.

Another object of the invention is to provide a device of the type referred to which, by centrifugal action, is self clearing so that its cutting elements are not likely to become clogged or fouled by accumulated matter during the grating operation.

A further object of the invention is to provide a mechanism of the class described which may be easily disassembled for cleaning.

The invention possesses other features of advantage, some of which will be specifically set forth in the detailed description of the invention hereunto annexed. It is to be understood that the invention is not to be limited to the specific form thereof herein shown and described as various other embodiments thereof may be employed within the scope of the appended claims.

Referring to the drawing.

Figure 3:
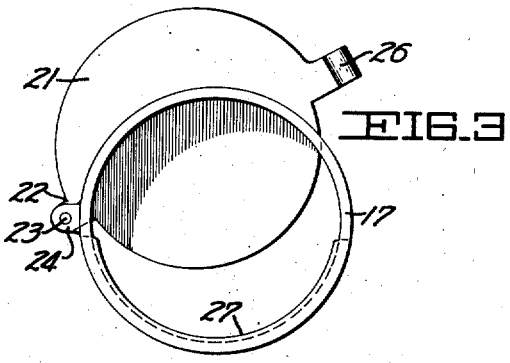
Figure 3 is an end elevational view of a portion of the pulper head. The direction in which the view is taken is indicated by the arrow 3 of Figure 1.

In detail, the pulper comprises a base 4 having rising from one side thereof an integral bracket 6 stiffened by buttress ribs 7 which join, respectively, the bracket and the base 4. A motor 8 is secured by bolts 9 to the top surface of the base and has its shaft 11 projecting through a clearance aperture 12 formed in the bracket 6. A suitable switch 13 for starting and stopping the motor 8 may be conveniently mounted in one of the side walls of the base 4. Removably secured, by bolts 14, to the bracket 6 is a mounting plate 16 secured to which is a tubular pulper housing 17 having an intake hopper 18 rising from the upper surface thereof and an outlet spout 19 projecting angularly from the bottom surface thereof. Coinciding with the intake hopper and outlet spout are apertures in the wall of the popular housing 17 so that the interior of the housing is in communication with the hopper and spout. Formed adjacent the outer end of the pulper housing is a transverse slit, extending a little more than half way around the circumference of the housing, in which is slidably mounted a sheet metal gate 21 forming a closure for the end of the housing. The gate is provided with a projecting lug 22 apertured to receive a pin 23 fixed in ears 24 formed on the housing so that the gate may be pivotally moved from closed to open positions, as shown in Figure 3, so as to expose the interior of the housing, and is also provided with an extension 26 which forms a handle for facilitating movement of the gate. A head 27, formed in the lower half of the internal periphery of the housing 17, seals the gate where the latter abuts the aforementioned periphery.

Figure 1:
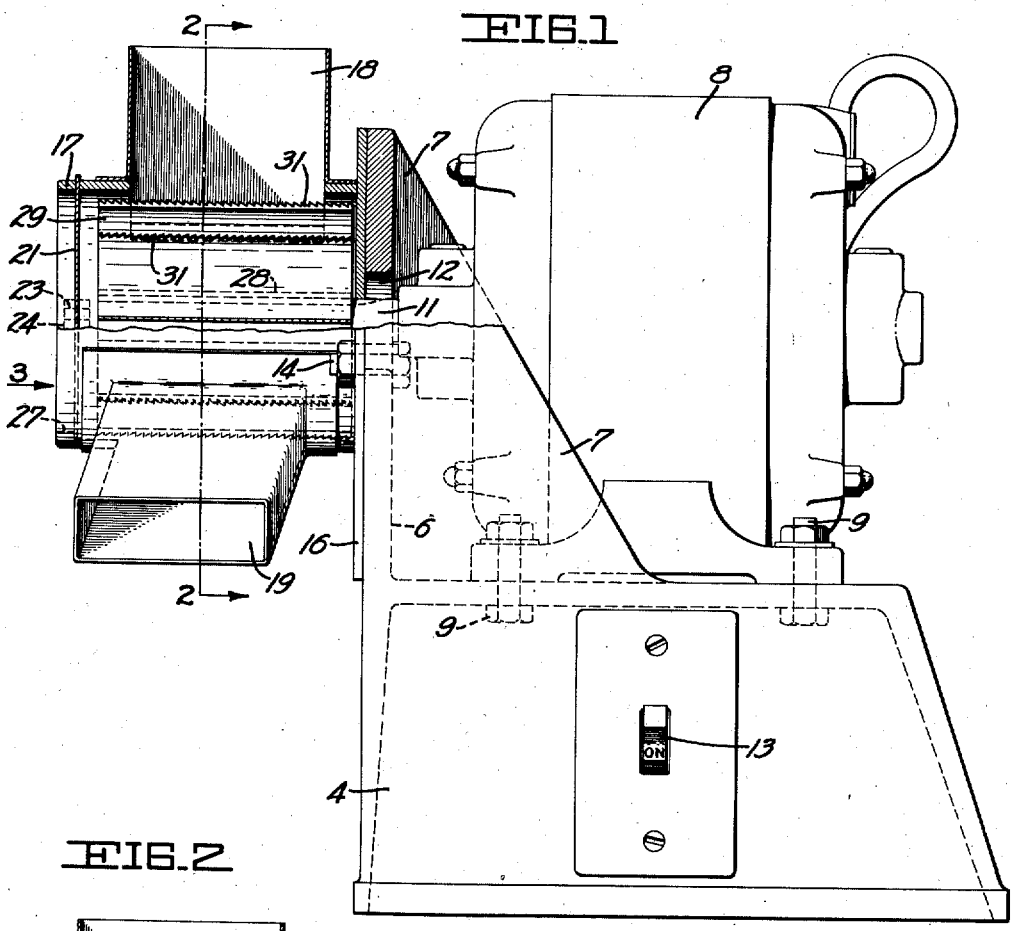
Figure 1 is a view, for the most part in side elevation, showing the complete pulper of my invention. A portion of the pulper is broken away and shown in vertical section so as to more clearly disclose the internal construction.
Figure 2:
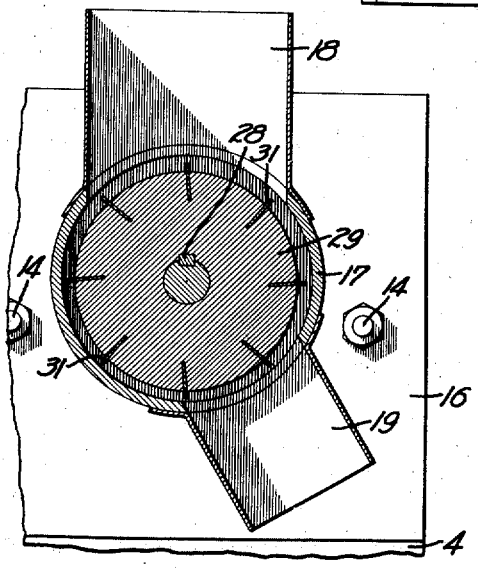
Figure 2 is a vertical sectional view taken in the plane indicated by line 2—2 of Figure 1.

Secured to the motor shaft 11, in any suitable manner such as by the key 28 shown, is a cylindrical rotor 29, constructed of wood or metal as desired, having a plurality, preferably eight, of circumferentially spaced longitudinally extending grooves cut in the periphery thereof in which are forcibly pressed metal cutter blades 31. These blades, as is clearly shown in Figure 1, may conveniently be short sections of saw blades arranged so that the teeth of successive blades are staggered with relation to those of its neighbors. The rotor body may, as described in the original patent and illustrated in the accompanying drawing, have the rotor 29 slightly off center so that the outer ends of the cutter blades 31 closely approach the inner periphery of the housing adjacent the opening of the outlet spout.

In operation, material to be pulped is placed in the intake hopper 18 and the motor 8 is started. Rotation of the rotor 29 will cause the toothed cutter blades 31 to abrade minute particles from the material and to carry these particles ahead of the blades toward the outlet spout 19 through which they are discharged into a suitable receptacle placed under the spout. It will be seen that, since the rotor revolves at the high speed of 1750 revolutions per minute, centrifugal force acting on the particles of material will tend to forcibly throw the latter into the outlet spout so that, at all times, the cutter blades will be cleared and the likelihood of the pulper becoming clogged is reduced to an absolute minimum. It will also be seen that the pulper may be easily cleaned since the passage of a small amount of water into the pulping housing through the inlet hopper will quickly wash, from the pulping chamber, all particles of material remaining therein after the pulping has been completed. In the event that the material being comminuted is sticky, or it is otherwise difficult to remove the water thereof, as explained above, the operator need only disengage the two bolts 14 from the mounting plate 16, whereupon the housing 17 and its attachments may be removed as a unit thus baring the rotor. The parts may then be separately cleaned in any effective manner.

It will be evident that the entire housing 17, the rotor 29, and the cutter blades 31 may be constructed of such material as stainless steel, Monel metal, or the like, so that the possibility of harmful metallic oxides coming in contact with foodstuffs that are pulped is obviated.

I claim:

1. A pulper comprising a base, a bracket rising from a side of said base, said bracket having therein an aperture, a motor mounted on said base having a rotatable shaft passing through said bracket aperture, a mounting plate removably secured to said bracket, an axially horizontal tubular housing secured to said mounting plate in eccentric relation to the axis of the motor shaft, said housing having in the top thereof an inlet opening through which material to be pulped may be introduced into said housing and having in the bottom thereof an outlet opening through which pulped material may be discharged from said housing, a gate pivotally mounted on and for closing an end of said housing, a cylindrical rotor secured to and rotatable with said motor shaft within said housing, said rotor having a plurality of axially parallel, circumferentially spaced, slots in the periphery thereof, and cutter blades secured in said slots, each of said cutter blades having spaced teeth formed in an edge thereof.

2. A pulper comprising a base, a bracket rising from a side of said base, said bracket having therein an aperture, a motor mounted on said base having a rotatable shaft passing through said bracket aperture, a mounting plate removably secured to said bracket, an axially horizontal tubular housing secured to said mounting plate in eccentric relation to the axis of said motor shaft, said housing having, in the top thereof, an inlet opening through which material to be pulped may be introduced into said housing, in the bottom thereof, an outlet opening through which pulped material may be discharged from said housing and, in an end thereof, a circumferentially extending slot, a gate pivotally mounted on and for closing an end of said housing, said gate being positioned for movement axially transversely of said housing and through said circumferential slot, a cylindrical rotor secured to and rotatable with said motor shaft within said housing, said rotor having therein a plurality of parallel, circumferentially spaced slots in the periphery thereof, cutter blades secured in said rotor slots, each of said cutter blades having spaced teeth formed in an edge thereof, and the teeth of alternate cutter blades being offset, axially of the rotor, with respect to the cutter teeth of adjacent cutter blades.

3. A pulper comprising a base, a bracket rising from a side of said base, said bracket having therein an aperture, a motor mounted on said base having a rotatable shaft passing through said bracket aperture, a mounting plate removably secured to said bracket, an axially horizontal tubular housing secured to said mounting plate around the axis of said motor shaft, said housing having in the top thereof an inlet opening through which material to be pulped may be introduced into said housing and having in the bottom thereof an outlet opening through which pulped material may be discharged from said housing, a gate for closing an end of said housing, a cylindrical rotor secured to and rotatable with said motor shaft within said housing, said rotor having a plurality of axially parallel, circumferentially spaced slots in the periphery thereof, and cutter blades secured in said slots, each of said cutter blades having spaced teeth formed in an edge thereof.

4. A pulper comprising a base, a bracket rising from a side of said base, said bracket having therein an aperture, a motor mounted on said base having a rotatable shaft passing through said bracket aperture, a mounting plate removably secured to said bracket, an axially horizontal tubular housing having an internally smooth bore secured to said mounting plate around the axis of the motor shaft, said housing having in the top thereof an inlet opening through which material to be pulped may be introduced into said housing and having in the bottom thereof an outlet opening through which pulped material may be discharged from said housing, means for closing and opening said tubular housing at the end thereof opposite the mounting plate during rotation of said shaft, and an abrading rotor carried by said shaft within said housing, said shaft being supported only from outside said housing.

5. A pulper comprising a bracket provided with an aperture and a shaft passing through said aperture, an axially horizontal tubular housing having a smooth internal bore secured to the bracket around the axis of the shaft, means removably securing said housing in such position with respect to said shaft and bracket, said housing having in the top thereof an inlet opening through which material to be pulped may be introduced into said housing and having in the bottom thereof an outlet opening through which pulped material may be discharged from said housing, means for closing and opening said tubular housing at the end thereof opposite the mounting plate during rotation of said shaft, and an abrading rotor carried by said shaft within said housing adapted to cooperate with the surface of the housing to form pulp of materials forced therebetween, said shaft having bearing support independent of said closing and opening means.

HUGH JAMES CRAWFORD.